(12) United States Patent
Yi et al.

(10) Patent No.: US 9,714,175 B2
(45) Date of Patent: Jul. 25, 2017

(54) SYSTEM FOR EXTRACTING LITHIUM CARBONATE FROM SALINE LAKE WATER

(71) Applicants: Tibet Jin Hao Investment Co., LTD., Tibet (CN); Binyuan Zhu, Tianhe District Guangzhou (CN)

(72) Inventors: Danqing Yi, Changsha (CN); Lihua Xiao, Changsha (CN); Bin Wang, Changsha (CN); Zhe Tian, Changsha (CN); Binyuan Zhu, Tianhe District Guangzhou (CN); Hao Yu, Tianhe District Guangzhou (CN)

(73) Assignees: Tibet Jin Hao Investment Co., Ltd., Tibet (CN); Binyuan Zhu, Guangdong (CN)

( * ) Notice: Subject to any disclaimer, the term of this patent is extended or adjusted under 35 U.S.C. 154(b) by 0 days.

(21) Appl. No.: 14/896,148

(22) PCT Filed: Jun. 18, 2014

(86) PCT No.: PCT/CN2014/080224
§ 371 (c)(1),
(2) Date: Dec. 4, 2015

(87) PCT Pub. No.: WO2014/202005
PCT Pub. Date: Dec. 24, 2014

(65) Prior Publication Data
US 2016/0115040 A1 Apr. 28, 2016

(30) Foreign Application Priority Data
Jun. 20, 2013 (CN) .......................... 2013 1 0247499

(51) Int. Cl.
C01D 1/42 (2006.01)
C01D 15/08 (2006.01)
C01D 1/30 (2006.01)
B01D 9/00 (2006.01)

(52) U.S. Cl.
CPC .......... *C01D 15/08* (2013.01); *B01D 9/0013* (2013.01); *B01D 9/0022* (2013.01); *B01D 9/0031* (2013.01); *C01D 1/30* (2013.01); *B01D 2009/0086* (2013.01)

(58) Field of Classification Search
CPC ....... C01D 1/42; B01D 9/0031; B01D 9/0013
USPC ....................................................... 23/302 R
See application file for complete search history.

(56) References Cited

FOREIGN PATENT DOCUMENTS

| CN | 102963914 | 3/2013 |
|---|---|---|
| CN | 103318928 | 9/2013 |
| CN | 103482660 | 1/2014 |

OTHER PUBLICATIONS

International Search Report for PCT/CN2014/080224 mailed Sep. 22, 2014, 4 pgs.
Zhao, Yuanyi et al., "Experiments on the Preparation of Mixed Salt and High-Content of Li2CO3 in Solar Pan of Zhabuye Saline Lake, Tibet, and Its Significance" Acta Geoscientica Sinica, vol. 5, No. 24, Oct. 31, 2003, pp. 459-462.

*Primary Examiner* — Edward Johnson
(74) *Attorney, Agent, or Firm* — Lowenstein Sandler LLP

(57) ABSTRACT

The present invention discloses a method for quickly extracting lithium carbonate from saline lake water and a system for the same. The method comprises: first quick-freezing the saline lake water to obtain lithium-rich brine, then evaporating under reduced pressure to enable lithium carbonate to be rapidly precipitated out. The method has advantages of short process flow and less labor consumption, thereby enabling continuous automatic operation, high energy utilization and environment-friendly. Further, the crystallization rate is several times faster than that of the salt-pan process and the grade of lithium carbonate salt mine obtained can reach 95% or more, therefore the method of the present invention is particularly suitable for industrial production in the remote saline lake region. The system comprises a reduced-pressure evaporation crystallizer, a vacuum-pumping apparatus, a brine preheating apparatus and a brine cooling apparatus, which concentrates the brine by quick-evaporation of the water, promotes lithium carbonate to form non-uniform nucleus, and improves the crystallization efficiency.

8 Claims, 2 Drawing Sheets

SYSTEM FOR EXTRACTING LITHIUM CARBONATE FROM SALINE LAKE WATER

FIELD OF THE INVENTION

The present invention relates to a method and a system for extracting lithium carbonate from a saline lake, specifically it relates to a method and a system for quickly extracting lithium carbonate from saline lake water.

BACKGROUND OF THE INVENTION

The saline lake contains many mineral salts and is an important source of mineral salts. However, large-scale exploitation of saline lake is difficult because the content of mineral salts in the saline lake is generally low. The main mining technologies of recent years are evaporation of saline lake water in the sun to obtain salt, deposit mining and the like, in which evaporation of saline lake water in the sun is the most environment-friendly exploitation method. Further development is seriously restricted because of its low efficiency. Therefore, a method which can improve the efficiency of the evaporation crystallization will have important strategic value.

Lithium is a metallic element having the lowest atomic weight. It possesses special properties such as the most negative potential, the greatest electrochemical equivalent, high specific heat, high conductivity, and strong chemical reactivity etc. It is an ideal metallic material for manufacturing disposable batteries, rechargeable power batteries, and structural material for aerospace etc. Thus, it is honored as the energy metal in the $21^{st}$ century.

In nature, lithium exists mainly in the form of pegmatite such as spodumene, lepidolite etc., and in the form of lithium ions in the saline lake brine, underground brine and seawater. The saline lake lithium resource reserves account for more than 69° A of the world industrial lithium reserves, while the saline lake lithium resource reserves of China account for 85° A of the industrial lithium reserves. Extracting lithium from saline lake brine possesses features such as simple technology, low energy consumption, and low cost. It has gradually substituted the production of lithium from lithium ore. Presently, there are many ways to extract lithium from saline lake, for example, ion exchange, adsorption, carbonization, precipitation, and extraction. However, these methods are immature, costly, or cannot meet the environmental requirements, thus, making it difficult to realize industrial production.

The current industrial production of lithium salt from saline lake in the country mostly employs salt-pan process, including enriching the lithium by brine evaporation in the drying bed in the winter, then pouring the lithium-rich brine into a solar pond for heat accumulation and retention until the temperature reaches between 30° C. and 50° C. More lithium carbonates reach oversaturation and precipitate as the solubility of lithium carbonate in brine is decreased with increasing temperature. Then, upon further chemical processing, the industrial grade of lithium carbonate is obtained. Although this process takes advantage of the superiority of plateau solar energy and cold energy, its production cycle is too long (the brine evaporation stage takes 4 to 6 months, the crystallization stage takes 2 to 4 months), leading to only one harvest a year, and the production efficiency is very low, leading to little benefit. Moreover, the construction of the solar pond requires lots of costs and materials, the geomembrane for heat preservation laying at the bottom of the pond is costly despite having poor leakage resistance. Therefore, a significant loss of brine results from the leakage problem of the geomembrane and it adversely affects the productivity and economic benefits.

The constituent of brine is very complex, having low content of lithium as compared to that of sodium and potassium. Therefore, it is necessary to concentrate the lithium before extraction so as to improve the grade of the lithium salt. The solubility of lithium carbonate in water decreases with temperature increase. This is referred to as an inverse solubility property. Experiment indicates that the solubility of lithium carbonate in brine has a similar property, while sodium salt and potassium salt have a positive solubility property. Therefore, the freezing method can be used to precipitate a large amount of sodium salt and potassium salt at low temperature, causing the preliminary enrichment of lithium in brine, then directly heat the lithium-rich brine to achieve the purpose of extracting high-grade lithium carbonate. The relational experiments show that sodium salt and potassium salt may precipitate out more quickly by quick-freezing than by general-freezing. Therefore, a higher enrichment efficiency of lithium can be achieved by using quick-freezing. If the concentration of lithium carbonate in brine has not reached saturation concentration at a certain temperature, then even if the temperature of the brine is higher, the lithium carbonate will not crystallize. As a result, it will have to be kept warm longer to allow the lithium salt reach saturation concentration and precipitate out. In order to shorten the holding time and accelerate the enrichment of lithium in brine, a reduced-pressure evaporation can be used.

Reduced-pressure evaporation is an efficient way for increasing evaporation rate. With regard to a water-containing solution or a volatile solvent-containing solution in a sealed container, the equilibrium between the liquid phase and the gas phase is balanced. When the system pressure decreases, i.e., after the gas phase on the surface of the liquid is removed, the equilibrium between the gas phase and the liquid phase is broken. Then, the water or volatile solute in the liquid phase tends to evaporate to supplement the gas phase so as to maintain the gas-liquid equilibrium. Thereby the boiling point of the solution decreases. The liquid phase will keep boiling and evaporating if the evaporated gas is continuously removed, and the solute will get continuously concentrated. When the solute concentration reaches the saturation concentration of this temperature, the solute will crystallize.

Many devices and methods have been reported for extracting $Li_2CO_3$ from saline lake brine both at home and abroad, for example, "Adsorption Techniques and Progress on the Extraction of Lithium from Salt Lake Brines" (Journal of Salt and Chemical Industry, vol. 36(3), 2007), "Preparation of Lithium Carbonate from Brines by Solvent Extraction" (Journal of Salt lake Research, vol. 14(2), 2006), "Progresses on the Process and Technique of Lithium Recovery from Salt Lake Brines Around the World" (World Sci-Tech R & D, vol. 28(5), 2006), "The Investigation on Lithium in the Bitterns of Enrichment by Solvent Flotation" (Journal of Salt and Chemical Industry, vol. 40(1), 2011) and the like. These devices and methods have the advantages that the adsorption method takes advantage of an ionic sieve type oxide by using its good selective adsorption property towards lithium characterized by a selective coefficient that can reach up to $10^4$ to $10^5$. Thus, it can be effectively used to extract lithium from saline lake brine, and its mechanical strength and chemical stability are excellent. Solvent extraction is suitable for saline lake brine having higher content of magnesium chloride, characterized by its simple technology, high product purity, and lower energy consumption. The carbonate precipitation method is a simple process, with high reliability. It is suitable for saline lake brine having a low ratio of magnesium to lithium. The disadvantages of the methods mentioned above are that: there are great differences between the practical and the theoretical adsorptive capacity of the ionic sieve type adsorbent; the poor permeability and difficulty to granulate restricts the industrial application of this method; the device is susceptible to corrosion; the loss of extracting agent is great in solvent extraction method; and low extraction efficiency in the general precipitation method. None of the methods mentioned above can achieve higher productivity while protecting the environment.

There still exists a need in the art to get a crystallization method and a device for effectively extracting lithium salt from saline lake brine which are also environment-friendly.

SUMMARY OF THE INVENTION

In view of the disadvantages of the salt pan technology in extracting lithium, such as high cost, not environment-friendly, long production cycle, the present invention aims to provide a method and a system for quickly extracting lithium carbonate from saline lake water.

The technical solution adopted by the present invention is that:

A method for quickly extracting lithium carbonate from saline lake water, comprising the following steps:

1) introducing the lithium-rich brine into a reduced-pressure evaporation crystallizer to enable lithium carbonate to reach oversaturation and precipitate from the lithium-rich brine by reduced-pressure evaporation;

2) discharging the residual liquid, collecting the precipitate in the crystallizer and drying the precipitate to obtain lithium carbonate crystals.

As a further improvement of the present invention, during the reduced-pressure evaporation, the pressure of the reduced-pressure evaporation crystallizer is maintained between 25 kPa and 45 kPa.

As a further improvement of the present invention, the temperature for reduced-pressure evaporation ranges from 60° C. to 80° C.

As a further improvement of the present invention, the lithium-rich brine is preheated before being introduced into a reduced-pressure evaporation crystallizer.

As a further improvement of the present invention, the preparation of the lithium-rich brine comprises: cooling saline lake brine to −40° C.~−20° C. to precipitate the sodium and potassium salt out of the brine; and separating the solids from the liquid to obtain the lithium-rich brine.

A system for quickly extracting lithium carbonate from saline lake water, comprising a reduced-pressure evaporation crystallizer, a vacuum-pumping apparatus, a brine preheating apparatus and a brine cooling apparatus. The reduced-pressure evaporation crystallizer has an outer wall, an inner container and an upper cover, a heater is equipped between the outer wall and the inner container, the top of the upper cover is equipped with a steam outlet and a brine inlet, the bottom of the upper cover is equipped with several detachable fins, and the steam outlet is connected with the vacuum-pumping apparatus. The vacuum-pumping apparatus is connected with the brine preheating apparatus, and the brine preheating apparatus is connected with the brine cooling apparatus via pipes.

As a further improvement of the present invention, the fins are configured to have cannelures.

As a further improvement of the present invention, the heater is equipped around outside of the inner container.

As a further improvement of the present invention, a heat exchanger used for pre-cooling the saline lake brine is equipped between the brine preheating apparatus and the brine cooling apparatus.

As a further improvement of the present invention, the heater is an electric heater.

The beneficial effects of the present invention are as follows:

1) by use of the abundant solar power in the plateau area to generate electricity for quick-freezing the brine, and subsequently heat the brine, the energy is clean and environment-friendly;

2) making full use of the inverse solubility characteristics of lithium carbonate and the positive solubility property of the sodium salt and potassium salt. Creatively using quick-cooling first followed by quick-heating technology by precipitating out the sodium and potassium salt, in the brine, quickly at a very low temperature, consequently enriching the concentration of lithium ion in the brine, and achieving the goals of separating impurities and enriching lithium;

3) during the reduced-pressure evaporation crystallization, controlling the temperature and pressure constant not only to enable the brine to continuously boil, evaporate and concentrate, but also to enable lithium carbonate to reach saturation more easily and precipitate out. Furthermore, the added fin devices increase the non-uniformly nucleation area of lithium carbonate. The residual lithium carbonate in the cannelures of fins may work as cores during next nucleation process, which contributes to quick nucleation and crystallizing of lithium carbonate;

4) the grade of lithium carbonate obtained by the method of the present invention is especially high and can reach 95% or even more; the precipitation rate of lithium carbonate can reach 99% which saves a large amount of energy. The discharged liquid contains almost no lithium which ensures the high usage rate of the brine;

5) as the method of the present invention is a purely physical process without using any chemicals, it is environment friendly. Continuous production, mechanization and automation during the whole-course can be realized by the method of the present invention, therefore the labor cost is reduced.

The device of the present invention can significantly promote water evaporation and make full use of the heat, therefore it has advantages of good acceleration effect and high crystallization efficiency. In addition, the acceleration process is a purely physical process, which is environment-friendly and green. Most of lithium carbonate obtained by crystallization adhere to the fins and is easily collected. Fresh water can be produced during the process of reduced-pressure evaporation, which is particularly suitable for remote saline lake mining area.

The fins are configured to have cannelures which would further increase the non-uniform nucleation area of $Li_2CO_3$, promote the nucleation and crystallization of $Li_2CO_3$, and increase the crystallization efficiency of $Li_2CO_3$.

After the vacuum-pumping apparatus is connected, the vapor pressure of the brine surface can be further decreased which accelerates the crystallization. The recycled steam enters into the brine preheating apparatus, efficiently making use of the energy.

The heater is equipped around the outside of the inner container which makes the saline lake brine self-circulate and develop a countercurrent flow after being heated, causing more uniform heating, while avoiding lithium carbonate fouling on the wall of the inner container to adversely affects heating efficiency.

A heat exchanger used for pre-cooling the saline lake brine is equipped between the brine preheating apparatus and the brine cooling apparatus, in which the saline lake brine is effectively pre-cooled, and the lithium-rich brine is heated up at the same time. Thereby, the energy consumption required for cooling and preheating can be reduced.

DETAILED DESCRIPTION

The present invention will be further illustrated below with reference to the accompanying drawings and embodiments.

Figure 1:
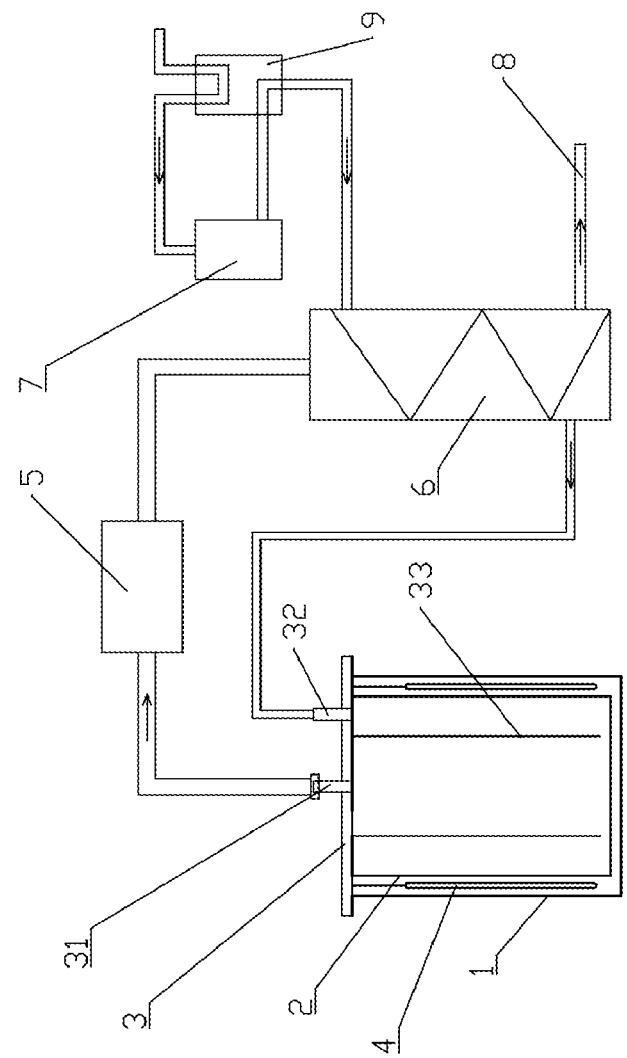
FIG. 1 is a structural schematic diagram of the device of the present invention.
Figure 2:
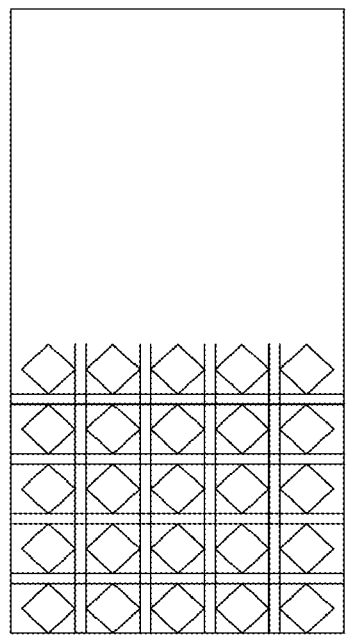
FIG. 2 is a structural schematic diagram of the fins of the device of the present invention.

Referring to FIGS. 1~2, a system for quickly extracting lithium carbonate from saline lake water, comprising a reduced-pressure evaporation crystallizer, a vacuum-pumping apparatus 5, a brine preheating apparatus 6 and a brine cooling apparatus 7. The reduced-pressure evaporation crystallizer has an outer wall 1, an inner container 2 and an upper cover 3. Heater 4 is equipped between the outer wall 1 and the inner container 2. The top of the upper cover 3 is equipped with a steam outlet 31 and a brine inlet 32, the bottom of which is equipped with several detachable fins 33. The steam outlet 31 is connected with the vacuum-pumping apparatus 5 which connected with the brine preheating apparatus 6, and the brine preheating apparatus 6 is connected with the brine cooling apparatus 7 via pipes.

As a further improvement of the present invention, the fins 33 are configured to have cannelures.

As a further improvement of the present invention, the heater 4 is equipped around outside the inner container 2. In particular, the heater is an electric heater.

As a further improvement of the present invention, a heat exchanger used for pre-cooling saline lake brine is equipped between the brine preheating apparatus and the brine cooling apparatus.

The electric energy used in the system of the present invention comes from solar power station. In the remote plateau area, the abundant solar energy resource can be used effectively, which is green and environment-friendly.

The fins are configured to have cannelures which further increase the non-uniformly nucleation area of $Li_2CO_3$, promote the nucleation and crystallization of $Li_2CO_3$, thereby increase the crystallization efficiency of $Li_2CO_3$.

After the vacuum-pumping apparatus is connected, the vapor pressure of the brine surface can be further decreased which accelerates the crystallization. The recycled steam enters into the brine preheating apparatus, making more efficient use of the energy.

The heater is equipped around the outside of the inner container which makes the saline lake brine self-circulate and develop a countercurrent flow after being heated, causing more uniform heating, while lithium carbonate fouling on the wall of the inner container, which adversely affects heating efficiency, can be avoided.

During operation, the saline lake brine is cooled in brine cooling apparatus 7. Preferably, filtrated lithium-rich brine is pre-cooled as it passes through the heat exchanger, which increases the temperature of the lithium-rich brine at the same time. Subsequently, the lithium-rich brine enters into the brine preheating apparatus 6 to be pre-heated, and then enters into the inner container 2 of the reduced-pressure evaporation crystallizer via the brine inlet 32. Then vacuum-pumping apparatus 5 is switched on to reduce the vapor pressure of the inner container 2, so as to accelerate evaporation and crystallization. Pumped-out steam enters into the brine preheating apparatus 6, and is collected by the via pipe 8.

Embodiment 1

1) The brine of North lake of Zhabuye saline lake taken in summer (the concentration of lithium ion is 0.78 g/L, and the initial temperature of the brine is 5° C. is cooled to −40° C. by industrial freezing system. After the precipitation of sodium chloride, potassium chloride, and aphthitalite, a solid-liquid separation is carried out to obtain the lithium-rich brine;

2) The obtained lithium-rich brine is transferred into the reduced-pressure evaporation crystallizers after being pre-heated by the preheating apparatus, wherein each crystallizer contains 30 L brine;

3) The brine is quickly heated to 60° C., evaporated at a reduced-pressure for 5 min, and the pressure of the crystallizer is balanced at 26 kPa. After 2 hours, a lithium-rich salt mixture having a thickness of about 2 mm has been deposited on the bottom of the crystallizer, and the residual brine is discharged.

The grade of obtained lithium carbonate in the mixture is 95.2%, and the precipitation rate of the lithium salt is 99.0%.

The operation is run continuously for seven days following the above procedure. The grade of lithium carbonate obtained from the salt crystallized in the reduced-pressure evaporation crystallizer is 95.2% and the mixture is of 3.55 tons. The time required for producing lithium carbonate is 1.97 days per ton on average.

Embodiment 2

1) The brine of North lake of Zhabuye saline lake taken in summer (the concentration of lithium ion is 0.54 g/L, and the initial temperature of the brine is 8° C.) is cooled to −30° C. using an industrial freezing system. After precipitation of sodium chloride, potassium chloride, and aphthitalite, a solid-liquid separation is carried out to obtain the lithium-rich brine;

2) The obtained lithium-rich brine is transferred into the reduced-pressure evaporation crystallizers after being pre-heated by the preheating apparatus, wherein each crystallizer contains 30 L brine;

3) The brine is quickly heated to 70° C., evaporated at a reduced-pressure for 5 min, and the pressure of the crystallizer is balanced at 36 kPa. After 2 hours, a lithium-rich salt mixture having a thickness of about 2 mm has been deposited on the bottom of the crystallizer, and the residual brine is discharged.

The grade of obtained lithium carbonate in the mixture is 95.8%, and the precipitation rate of the lithium salt is 99.6%.

The operation is run continuously for seven days following the above procedure. The grade of lithium carbonate obtained from the salt precipitated in the reduced-pressure evaporation crystallizer is 95.8% and the mixture is of 3.80 tons. The time required for producing lithium carbonate is 1.84 days per ton on average.

Embodiment 3

1) The brine of salt-span of Zhabuye saline lake which has been dried in the sun for 10 days (the concentration of lithium ion is 1.2 g/L, and the initial temperature of the brine is 5° C.) is cooled to −20° C. by industrial freezing system. After precipitation of sodium chloride, potassium chloride, and aphthitalite, a solid-liquid separation is carried out to obtain the lithium-rich brine;

2) The obtained lithium-rich brine is transferred into the reduced-pressure evaporation crystallizers after being preheated by the preheating apparatus, wherein each crystallizer contains 30 L brine;

3) The brine is quickly heated to 75° C., evaporated at a reduced-pressure for 5 min, and the pressure of the crystallizer is balanced at 40 kPa. After 2 hours, a lithium-rich salt mixture having a thickness of about 4 mm has been deposited on the bottom of the crystallizer, and the residual brine is discharged.

The grade of obtained lithium carbonate in the mixture is 96.6%, and the precipitation rate of the lithium salt is 99.0%.

The operation is run continuously for seven days following the above procedure. The grade of lithium carbonate obtained from the salt precipitated in the reduced-pressure evaporation crystallizer is 96.6% and the mixture is of 4.01 tons. The time required for producing lithium carbonate is 1.75 days per ton on average.

Embodiment 4

1) The brine of salt-span of Zhabuye saline lake which has been dried in the sun for 60 days (the concentration of lithium ion is 2.1 g/L, and the initial temperature of the brine is 12° C.) is cooled to −20° C. by industrial freezing system. After precipitation of sodium chloride, potassium chloride, and aphthitalite, a solid-liquid separation is carried out to obtain the lithium-rich brine;

2) The obtained lithium-rich brine is transferred into the reduced-pressure evaporation crystallizers after being preheated by the preheating apparatus, wherein each crystallizer contains 30 L brine;

3) The brine is quickly heated to 80° C., evaporated at a reduced-pressure for 5 min, and the pressure of the crystallizer is balanced at 45 kPa. After 2 hours, a lithium-rich salt mixture having a thickness of about 5 mm has been deposited on the bottom of the crystallizer, then the residual brine is discharged.

The grade of obtained lithium carbonate in the mixture is 97.3%, and the precipitation rate of the lithium salt is 99.8%.

The operation is run continuously for seven days following the above procedure. The grade of lithium carbonate obtained from the salt precipitated in the reduced-pressure evaporation crystallizer is 97.3% and the mixture is of 4.28 tons. The time required for producing lithium carbonate is 1.63 days per ton on average.

As can be seen from the data of the above embodiments, lithium carbonate can be quickly and effectively extracted from the saline lake brine. The grade of lithium carbonate obtained by the method of the present invention is especially high, even can reach 95% or more, and the total recovery can reach 99%.

The device of the present invention can significantly promote moisture evaporation and make full use of the heat, therefore has advantages of good acceleration effect and high crystallization efficiency. The acceleration process is a purely physical process, which is environment-friendly and green. Most of lithium carbonate obtained by crystallization adhere to the fins and are easy to be collected. When the crystallization process of lithium carbonate is accelerated, the fresh water can also be produced, which is particularly suitable for remote saline lake mining area.

The invention claimed is:

1. A system for extracting lithium carbonate from saline lake water, the system comprising:
   a reduced-pressure evaporation crystallizer;
   a vacuum-pumping apparatus;
   a brine preheating apparatus; and
   a brine cooling apparatus,
   wherein the reduced-pressure evaporation crystallizer comprises an outer wall, an inner container and an upper cover,
   a heater equipped between the outer wall and the inner container,
   wherein the upper cover comprises a top and a bottom,
   wherein the top of the upper cover is equipped with a steam outlet and a brine inlet and the bottom of the upper cover is equipped with several detachable fins,
   wherein the steam outlet is connected with the vacuum-pumping apparatus via pipes,
   wherein the vacuum-pumping apparatus is connected with the brine preheating apparatus via pipes, and
   wherein the brine preheating apparatus is connected with the brine cooling apparatus via pipes.

2. The system according to claim 1, wherein the fins are configured to have cannelures.

3. The system according to claim 1, wherein the heater is equipped outside of the inner container.

4. The system according to claim 1, wherein a heat exchanger used for pre-cooling the saline lake water is equipped between the brine preheating apparatus and the brine cooling apparatus.

5. The system according to claim 1, wherein the heater is an electric heater.

6. The system according to claim 2, wherein the heater is equipped outside of the inner container.

7. The system according to claim 2, wherein a heat exchanger used for pre-cooling the saline lake water is equipped between the brine preheating apparatus and the brine cooling apparatus.

8. The system according to claim 2, wherein the heater is an electric heater.

* * * * *